United States Patent [19]

Buchko et al.

[11] Patent Number: 4,915,283

[45] Date of Patent: Apr. 10, 1990

[54] CLAMPING ARRANGEMENT FOR GRIPPING AND CARRYING WEB MATERIAL

[75] Inventors: Raymond G. Buchko, Appleton; John A. Halgren, Neenah, both of Wis.

[73] Assignee: Curwood, Inc., Oshkosh, Wis.

[21] Appl. No.: 254,413

[22] Filed: Oct. 6, 1988

[51] Int. Cl.[4] .................. B65H 29/04; B65H 70/16
[52] U.S. Cl. ............................. 226/173; 198/803.7
[58] Field of Search .......... 226/173, 161, 162, 189, 226/74, 75, 170–172; 198/803.01, 803.07, 803, 695

[56] References Cited

U.S. PATENT DOCUMENTS

| 4,520,613 | 6/1985 | Claudio | 226/173 X |
| 4,624,726 | 11/1986 | Harper | 226/173 X |
| 4,693,362 | 9/1987 | Kemmerer et al. | 198/803.7 |
| 4,826,065 | 5/1989 | Natterer et al. | 226/173 |
| 4,846,064 | 7/1989 | Hoshi | 198/803.7 X |

FOREIGN PATENT DOCUMENTS

| 53-98687 | 8/1978 | Japan | 198/803.7 |
| 55-98010 | 7/1980 | Japan | 198/803.01 |
| 62-191325 | 8/1987 | Japan | 198/803.7 |

Primary Examiner—Donald Watkins
Attorney, Agent, or Firm—Lee, Mann, Smith, McWilliams & Sweeney

[57] ABSTRACT

A clamping arrangement is disclosed for gripping and carrying web material about a die turret of a packaging machine for molding the web and for carrying the web through and off the packing machine as product is loaded and the package is sealed. The clamping arrangement includes a pair of aligned drive chains and a plurality of facing clamps mounted on each chain. Each clamp includes a lower jaw and an upper jaw pivotally mounted to the lower jaw and actuable between an opened and a closed position. A spring is connected between the upper and lower jaws which biases the upper jaw to the closed position. The lower and upper jaws each define complemental gripping teeth along an edge thereof, the respective teeth being disposed intermediate and adjacent one another when the upper jaw is in the closed position. The teeth of the lower jaw are horizontally aligned with the pitch line of the drive chain when assembled to the chain.

16 Claims, 2 Drawing Sheets

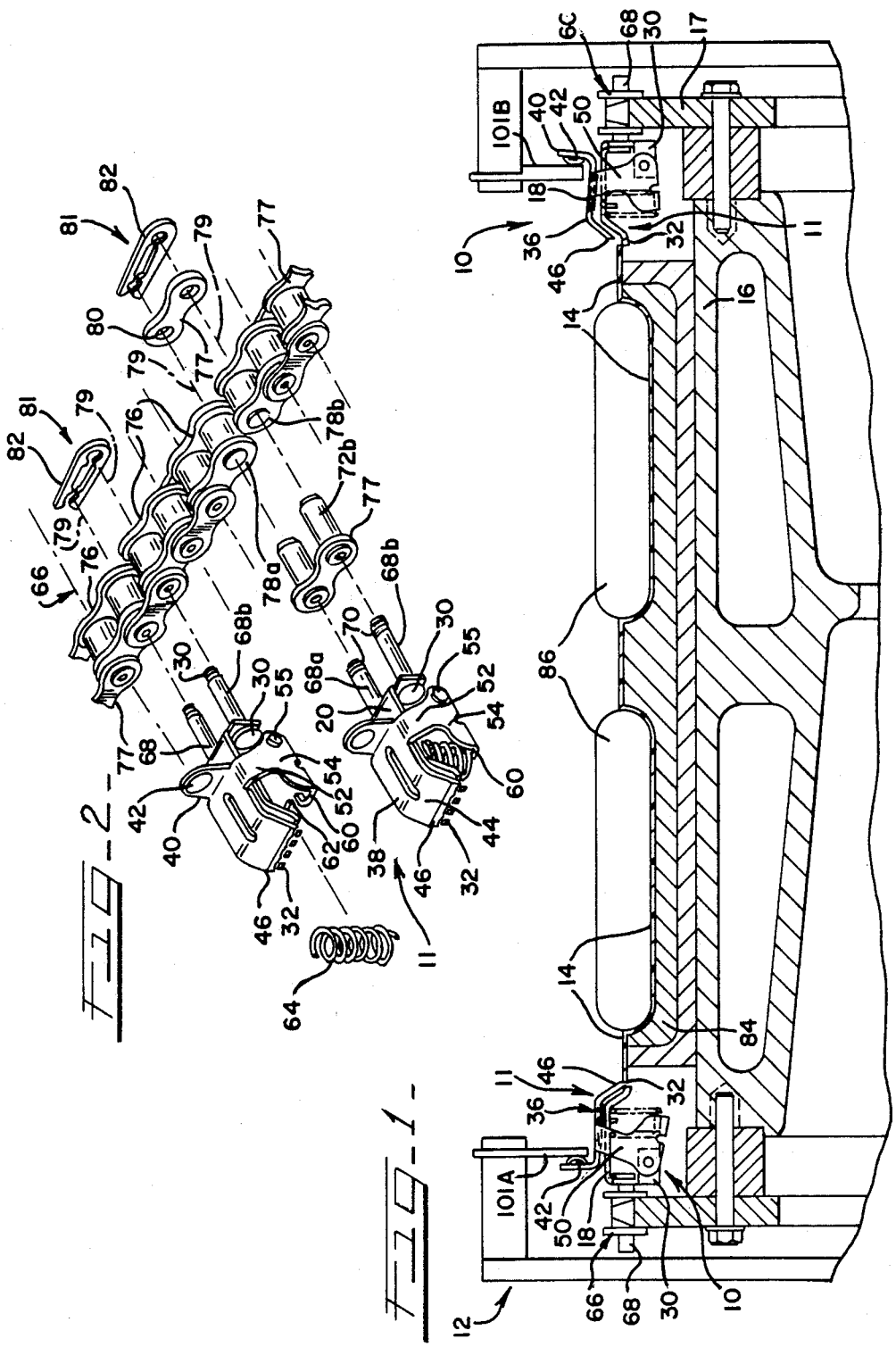

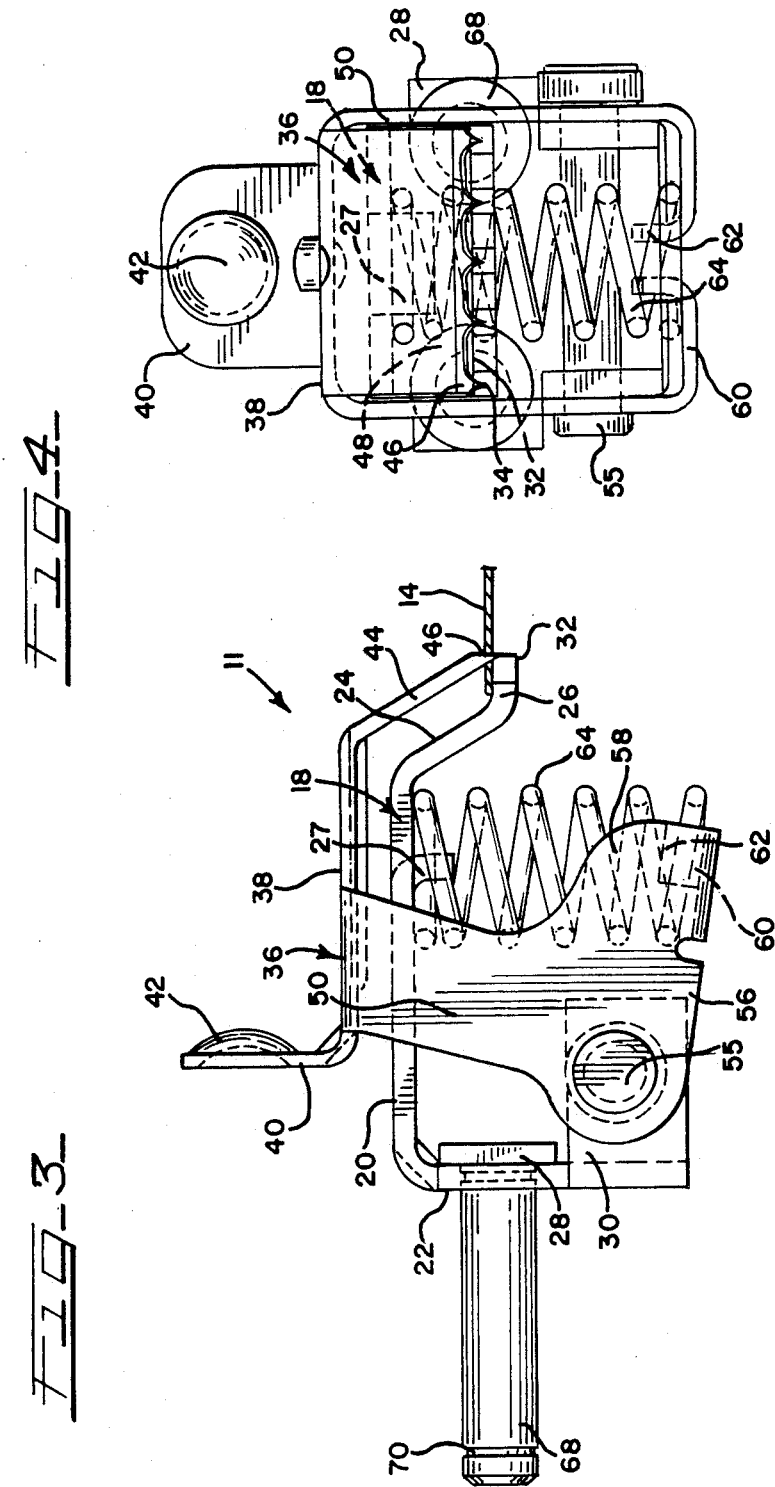

CLAMPING ARRANGEMENT FOR GRIPPING AND CARRYING WEB MATERIAL

BACKGROUND OF THE INVENTION

The present invention is directed to a clamping arrangement for gripping and carrying web material about a die turret of a packaging machine. More particularly, it is directed to a biased clamping arrangement having a pair of aligned drive chains extending about a die turret which include a plurality of facing clamps. Each clamp is automatically actuable to assume an opened or closed position at predetermined, set intervals along the drive path of the drive chains to grasp or release the web. Numerous prior art patents disclose clamping arrangements of this general type. These include U.S. Pat. Nos. 1,109,541; 2,997,157; 3,703,954; 3,713,648; 4,068,882; 4,172,514; 4,201,286 and 4,654,227. None of the foregoing patents discloses the features of the present invention.

BRIEF DESCRIPTION OF THE DRAWINGS

FIG. 1 shows a split cross-section of a packaging machine incorporating the clamping arrangement of the present invention showing two positions along the path thereof.

FIG. 2 shows a perspective exploded view of a portion of the clamping arrangement of the present invention.

FIG. 3 shows a side view of a clamp of the present invention in the closed or gripping position.

FIG. 4 shows a front view of the clamp shown in FIG. 3.

SUMMARY OF THE INVENTION

The present invention provides a clamping arrangement for gripping and carrying web material. The clamping arrangement includes a pair of aligned chains each provided with a plurality of facing clamps. Each clamp includes a first jaw member and a second jaw member. The first jaw member includes attachment means to connect it to the drive chain. It also defines a plurality of gripper teeth aligned with the attachment means such that the gripper teeth are on the pitch line of the chain. The second jaw member is pivotally mounted to the first jaw member and defines a plurality of complemental gripper teeth. The second jaw member is provided with an actuating member which is actuable to move the second jaw member between an open and a closed position. A spring is provided between the second and first jaw members to bias the upper jaw member to the closed position.

DETAILED DESCRIPTION OF THE INVENTION

A clamping arrangement generally designated by the numeral 10, is shown in the drawings. The clamping arrangement 10 is associated with a packaging machine 12 for packaging, for example, hot dogs, and is adapted to releasably grip and carry a plastic web 14 about a die turret 16 of the packaging machine where the web 14 is molded to form the bottom portion of the package.

The clamping arrangement 10 includes a pair of aligned opposing drive chains 66, each driven by a sprocket 17, which chains travel about a set, predetermined path within the packaging machine 12. As seen in FIG. 1, a portion of the path of travel is about the die turret 16. A plurality of clamps 11 are fastened to the drive chains 66 at fixed distances from one another, such that the clamps 11 on one drive chain 66 are directly aligned with and face the clamps on the opposing drive chain.

As best seen in FIGS. 2 through 4, each clamp 11 includes a first or lower jaw member 18, a second or upper jaw member 36, a biasing means or spring 64 and an attachment mechanism. The lower jaw member 18 defines a substantially flat, rectangular upper wall 20, disposed generally horizontally, a rear wall 22 extending from and in perpendicular relation to the rear end of the upper wall 20 and an outwardly and downwardly sloping front face 24, terminating in a plurality of horizontally disposed spaced gripper teeth 32. A projection 27 extends downwardly from the underside of the upper surface 20 of the lower jaw member 18. The rear wall 22 is provided with laterally extending arms 28 at the upper portion of each side thereof. The lower portions of each side of the rear face 22 are provided with a flange 30 which extends forwardly in perpendicular relation to the rear face 22.

Upper jaw member 36 defines a substantially flat, rectangular upper wall 38 having a vertical tab 40 extending upwardly from the rear end thereof. The tab 40 defines a substantially hemispherical abutment surface 42, the purpose of which will be explained.

The front edge of the upper wall 38 is provided with an outwardly extending and downwardly sloping front wall 44 defining at its one end a plurality of downwardly extending gripper teeth 46. As best seen in FIG. 4, the gripper teeth 46 and 32 are adapted to interengage, with the teeth of one jaw member disposed between spaces defined by the teeth of the opposing jaw member. This relation provides a tight grasp of web 14 such that the web lies in a horizontal plane which passes through the central axis or pitch line of the chain.

Integrally formed, generally L-shaped arms 50 depend downwardly from each side of the upper surface 38 of the upper jaw member 36. The lower ends 56 of the arms 50 are pivotally mounted to the flanges 30 of the lower jaw member 18 by rivets 55. This permits the upper jaw member 36 to pivot between a closed or gripping position wherein the web 14 is clamped between the gripper teeth 46 and 32 of the upper and lower jaw members 36 and 18, respectively, and lies in a horizontal plane which passes through the pitch line of the chain as shown in FIG. 1 left side and FIGS. 2–4, and an open or released position whereby the upper jaw member 36 pivots upwardly so that the gripper teeth 46 thereof disengage the web 14 as seen in FIG. 1, right side.

Arms 50 are of a length such that the upper surface 38 of the upper jaw member 36 is disposed a distance above the upper surface 20 of the lower jaw member 18. As best seen in FIG. 3, when the upper jaw member 36 is in the closed position, the upper surface 38 and front face 44 are disposed in substantially parallel relation to the upper surface 20 and front face 24 of the lower jaw member 18. Teeth 46 of upper jaw member 36 are engaged with teeth 32 of lower jaw member 18.

As best seen in FIG. 4, the free ends of ∓L" shaped arms 50 are provided with spring support platforms 60, extending toward each other which define at their inner adjacent edges upwardly extending flanges 62. One end of a coil spring 64 is disposed about the flanges 62 and rests on the platforms 60. The other end of the spring 64 is disposed about the projection 27 depending from the underside of the upper surface 20 of the lower jaw member 18. The spring 64 biases the upper jaw member 36 to pivot clockwise about rivets 55 and normally assume the closed or gripping position.

Each clamp 11 includes an attachment mechanism including a pair of elongated link pins 68A and 68B which connect clamps 11 to chains 66. Pins 68 extend outwardly from the rear of each lateral arm 28 of lower jaw member 18 in a direction away from gripper teeth 32. The pins 68 are disposed such that the longitudinal centerline of each pin is in the same plane as are the teeth 32. Each pin 68 includes a groove 70 about the periphery of its free end.

Chains 66 are comprised of pivotally connected alternate inner and outer links 76 and 77. The links pivot upon transverse centerlines 79, shown in FIG. 2 all of which lie in the same horizontal plane. The pivot centers define what is known as the pitch line of the chain 66.

Inner links 76 are integrally formed and include spaced apart hour glass shaped side plates connected by a pair of transverse hollow drive barrels 78. The barrels 78 interact with the sprocket teeth of sprocket 17.

Each outer link 77 has one pin 72A positioned in one barrel 78A of an inner link 76, and the other pin 72B in one barrel 78B of an adjacent inner link 76.

Clamps 11 are attached to the chains 66 by specially configured separable outer clips, generally designated 81, which clip over, and are removably secured within, the grooves 70 on pins 68. Link pins 68A and 68B are sized such that they may be disposed within apertures formed in links 77 and extend through pins 72A and 72B and then through barrels 78A and 78B of adjacent inner links 76. The link pins 68 are of a length sufficient to permit the relieved portions 70 to extend outward of the side plates when the link pins are disposed in the barrels 78. "C" clip 81 is removably attached to the grooves 70 at the free end of the link pins 68 to complete the separable outer link and attach the associated clamp 11 to the chain 66.

Clamps 11 are positioned at appropriate intervals along chains 66. The link pins 68, pins 72 and barrels 78 are all positioned coaxially of each other and are on the pitch line of the chain. Teeth 32 of lower jaw 36 are aligned with the centerline or axis of the link pins 68. The engagement of teeth 32 and 46 of clamps 11 is therefore in the plane of the pitch line of the chains 66. An attached web thus is retained and lies within the same plane as it is carried by the clamping arrangement. This horizontal alignment allows the clamps 11 and the web 14 to travel adjacent the path of the drive chains 66 to follow the die turret 16 of the packaging machine 12.

As shown in the split section of FIG. 1, at a predetermined point along the path of travel of the drive chains 66, the abutment surfaces 42 extending from the upper surfaces 38 of the opposing upper jaw members 36 contact actuating members 101B which extend downwardly from the frame of the machine 12 to cause the upper jaw members 36 to pivot upwardly from the closed position to the open position as shown on the right side of FIG. 1, thereby releasing the web. As the drive chains 66 continue along their paths, each clamp 11 opens in the same manner at the same point. At the inlet end of the packaging machine, a length of the bottom web 14 is fed between the opposing jaws of clamps 11 in the open position such that the respective edges of the web 14 are disposed between the upper and lower jaw members 36, 18 of each open clamp. At another predetermined point along the path of travel of the drive chains 66, the actuating members terminate or become thinner, as shown at 101A on the left side of FIG. 1, and thus disengage from the abutment surfaces 42 so that the upper jaw members 36 pivot downwardly to a closed position (left side of FIG. 1), whereby the upper gripper teeth 46 and the complemental lower gripper teeth 32 tightly and securely grip the web 14. The thicker the web, the greater is the clamping force of the clamps 11. This is true because a thicker web will separate the jaws 18 and 36 further than a thin web and, hence, the spring 64 will be compressed further, creating an increased closing force.

As seen in FIG. 3, a downward load on the gripped web causes an increase in the closing force upon the moveable jaw 36. This occurs because of the position of pivot at rivets 55 and the relative position of the engaged jaws 18 and 36. This permits the use of a spring 64 which applies less force than would otherwise be necessary, hence, increasing the expected life of the clamp.

The clamps 11 carry the web 14 about the die turret of the package molds 84. The web 14 is then molded to conform to the package mold 84. As seen in FIG. 1, once the web 14 is molded to form the bottom portion of a package the good product 86, in this instance, hot dogs, designated 86, are placed in the bottom portion. The clamping arrangements 10 continue to grip and carry the edges of the formed web about the drive chain's path of travel until, at a fixed point, abutment surfaces 42 engage thicker actuating members 101B which cause the upper jaw members 36 to pivot upwardly, as illustrated in the right side of FIG. 1, thereby releasing the edges of the web 14. Clamping arrangement 10 continues about the path to repeat the cycle.

Thus, it has been shown that the present invention provides a clamping arrangement for gripping and carrying a web about a turret of a web molding machine. It must be understood, however, that the clamps of the arrangement may be used in a variety of applications without departing from the spirit and purpose of the invention. The clamps are of particular utility by virtue of the alignment of the attachment means and the teeth of the lower jaw such as to place the engagement of the teeth on the pitch line of an associated carrying chain.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A clamping arrangement for gripping and carrying a web in a packaging machine, said clamping arrangement including a pair of aligned drive chains formed of interconnected links pivotal upon a pitch line of said chain, and adapted to continuously travel a predetermined path, a plurality of clamps spaced from each other, attached to each one of said chains in facing relation to clamps on the other of chains each said clamp having:

(a) a first jaw member connectable to said drive chain, defining at one edge thereof a plurality of gripper teeth;

(b) a second jaw member disposed adjacent and pivotally mounted to said first jaw member, said second jaw member movable between an open position and a closed position, and defining at one edge thereof a plurality of gripper teeth which are disposed in complemental, intermediate relation to said gripper teeth of said second jaw member when said second jaw member is in said closed position;

(c) resilient biasing means disposed between said first and second jaw members to bias said second jaw member to said closed position;

(d) actuation means associated with said second jaw member which, when actuated, urge said second jaw member to said open position;

(e) attachment means on said first jaw member for fastening said first jaw member to one of said drive chains such that said clamp extends laterally outwardly from said drive chain, said attachment means positioned such that when said second jaw member is in said closed position said web which is gripped between said first and second jaw members lies in a horizontal plane which passes through said pitch line of said chain.

2. A clamping arrangement as claimed in claim 1 wherein said attachment means including a pair of elongated link pins connected to said first jaw member, the teeth of said first jaw member being disposed in the plane of the centerline of said pins.

3. A clamping arrangement as claimed in claim 2 wherein said second jaw member engages said first jaw member in the plane of said centerline of said link pins when said jaws are in said closed position.

4. A clamping arrangement as claimed in claim 3 wherein said first jaw member includes a substantially flat wall and a rear wall extending perpendicularly therefrom and defining a pair of lateral arms, each said link pin being secured to one of said arms.

5. A clamping arrangement as claimed in claim 4 wherein said flat wall is disposed generally horizontally above the plane of said centerlines of said link pins and said first jaw member further includes a downwardly sloping front face extending between said flat wall and said gripper teeth.

6. A clamping arrangement as claimed in claim 5 wherein said second jaw member comprises an upper jaw member and includes a substantially flat wall overlying the wall of said first jaw member and a downwardly sloping front wall defining at its free end said gripper teeth of said second jaw member.

7. A clamping arrangement as claimed in claim 6 wherein said second jaw member includes a pair of "L" shaped arms pivotally attached to said first jaw member, said arms defining spring platform means underlying said second wall of said first jaw member, said biasing means comprising a compressible resilient spring disposed between said platform means and said second wall portion of said first jaw member.

8. A clamping arrangement as claimed in claim 7 wherein said second jaw member includes a vertical tab to extend from said flat second wall, said tab defining an abutment surface, said tab adapted on contact of said abutment surface with a camming means to move second jaw member from said closed to said open position.

9. A clamp for attachment to a drive chain for gripping and carrying a web said clamp having:

(a) a first jaw member connectable to said drive chain, defining at one edge thereof a plurality of gripper teeth;

(b) a second jaw member disposed adjacent and pivotally mounted to said first jaw member, said second jaw member movable between an open position and a closed position, and defining at one edge thereof a plurality of gripper teeth which are disposed in complemental, intermediate relation to said gripper teeth of said first jaw member when said second jaw member is in said closed position;

(c) resilient biasing means disposed between said first and second jaw members to bias said second jaw member to said closed position;

(d) actuation means associated with said second jaw member which when actuated, urge said second jaw member to said open position;

(e) attachment means on said first jaw member for fastening said clamp to said drive chains such that said clamp extends laterally outwardly from said drive chain, said attachment means positioned such that when said second jaw member is in said closed position said web which is gripped between said first and second jaw members lies in a horizontal plane which passes through said pitch line of said chain.

10. A clamp as claimed in claim 9 wherein said attachment means includes a pair of elongated link pins connected to said first jaw member, the teeth of said first jaw member being disposed in the plane of the centerline of said pins.

11. A clamp as claimed in claim 10 wherein said second jaw member engages said first jaw member in the plane of said centerline of said link pins when said jaws are in said closed position.

12. A clamp as claimed in claim 11 wherein said first jaw member includes a substantially flat wall and a rear wall extending perpendicularly therefrom and defining a pair of lateral arms, each said link pin being secured to one of said arms.

13. A clamp as claimed in claim 12 wherein said flat wall is disposed generally horizontally above the plane of said centerlines of said link pins and said first jaw member further includes a downwardly sloping front face extending between said flat wall and said gripper teeth.

14. A clamp as claimed in claim 13 wherein said second jaw member comprises an upper jaw member and includes a substantially flat wall overlying the wall of said first jaw member and a downwardly sloping front wall defining at its free end said gripper teeth of said second jaw member.

15. A clamp as claimed in claim 14 wherein said second jaw member includes a pair of "L" shaped arms pivotally attached to said first jaw member, said arms defining spring platform means underlying said second wall of said first jaw member, said biasing means comprising a compressible resilient spring disposed between said platform means and said second wall portion of said first jaw member.

16. A clamp as claimed in claim 15 wherein said second jaw member includes a vertical tab to extend from said flat second wall, said tab defining an abutment surface, said tab adapted on contact of said abutment surface with a camming means to move second jaw member from said closed to said open position.

* * * * *

UNITED STATES PATENT AND TRADEMARK OFFICE
CERTIFICATE OF CORRECTION

PATENT NO. : 4,915,283
DATED : April 10, 1990
INVENTOR(S) : Raymond G. Buchko
John A. Halgren It is certified that error appears in the above-identified patent and that said Letters Patent is hereby corrected as shown below:

In claim 1, subparagraph (b), column 5, line 3, delete "second" and substitute -- first -- therefor.

Signed and Sealed this

Twenty-eighth Day of September, 1993

Attest:

BRUCE LEHMAN

*Attesting Officer*   *Commissioner of Patents and Trademarks*